US009973235B2

(12) United States Patent
Chuang et al.

(10) Patent No.: US 9,973,235 B2
(45) Date of Patent: May 15, 2018

(54) SIGNAL RECEIVING DEVICE FOR ETHERNET AND CONTROL METHOD THEREOF

(71) Applicant: REALTEK SEMICONDUCTOR CORPORATION, Hsinchu (TW)

(72) Inventors: Sheng-Fu Chuang, Taichung (TW); Liang-Wei Huang, Hsinchu (TW); Ching-Yao Su, Taichung (TW); Hsuan-Ting Ho, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 125 days.

(21) Appl. No.: 14/799,023

(22) Filed: Jul. 14, 2015

(65) Prior Publication Data
US 2016/0036489 A1 Feb. 4, 2016

(30) Foreign Application Priority Data

Jul. 29, 2014 (TW) .............................. 103125771 A (51) Int. Cl.
*H04B 3/32* (2006.01)
*H04L 25/03* (2006.01)

(52) U.S. Cl.
CPC .......... *H04B 3/32* (2013.01); *H04L 25/03057* (2013.01)

(58) Field of Classification Search
CPC .... H04B 3/32; H04L 25/03057; H04L 25/497
See application file for complete search history.

(56) References Cited

U.S. PATENT DOCUMENTS 8,442,099 B1 * 5/2013 Sederat .................... H04B 3/30
375/219
2008/0253489 A1 10/2008 Huang
(Continued)

FOREIGN PATENT DOCUMENTS

| TW | 200843367 | 11/2008 |
| WO | 9946867 | 9/1999 |

OTHER PUBLICATIONS

Barry, Lee and Messerschmitt. Digital Communication Third Edition. 2004 Kluwer Academic Publishers. chapters 8 and 9 Equalization and Adaptive Equalization.*
(Continued)

*Primary Examiner* — Jeffrey M Rutkowski
*Assistant Examiner* — Basil Ma
(74) *Attorney, Agent, or Firm* — WPAT, PC (57) ABSTRACT

This invention discloses a signal receiving device for Ethernet and a control method thereof. The signal receiving device includes a gain control circuit, an alien near-end crosstalk canceller, a noise canceller, and a DFE. The gain control circuit adjusts an input signal of the signal receiving device according to a setting parameter. The alien near-end crosstalk canceller cancels an alien near-end crosstalk interference. The noise canceller uses a first filter to cancel noises. The DFE uses a second filter to cancel an inter-symbol interference of the input signal. The method includes steps of: temporarily stopping the gain control circuit from updating the setting parameter before a seed collision occurs, and temporarily stopping one of the noise canceller and the decision feedback canceller from updating the first filter coefficient of the first filter or the second filter coefficient of the second filter temporarily during the seed collision.

24 Claims, 9 Drawing Sheets

(56) References Cited

U.S. PATENT DOCUMENTS

| | | | |
|---|---|---|---|
| 2009/0022210 A1* | 1/2009 | Matsumoto | H04B 1/7097 375/148 |
| 2009/0052509 A1* | 2/2009 | Agazzi | G01R 31/3004 375/219 |
| 2009/0154355 A1 | 6/2009 | Diab et al. | |
| 2012/0137162 A1* | 5/2012 | Huang | H04L 5/001 714/2 |
| 2013/0072133 A1* | 3/2013 | Chu | H04B 1/38 455/73 |
| 2013/0114390 A1* | 5/2013 | Chu | H04B 3/32 370/201 |
| 2015/0117635 A1 | 4/2015 | Ho et al. | |

OTHER PUBLICATIONS

TW200843367 is also published as USUS2008253489.

* cited by examiner

SIGNAL RECEIVING DEVICE FOR ETHERNET AND CONTROL METHOD THEREOF

BACKGROUND

1. Field of the Invention

This invention relates to an Ethernet signal receiving device and the control method thereof, especially to a signal receiving device with noise cancellers and methods of controlling the signal receiving device.

2. Description of Related Art

Figure 1:
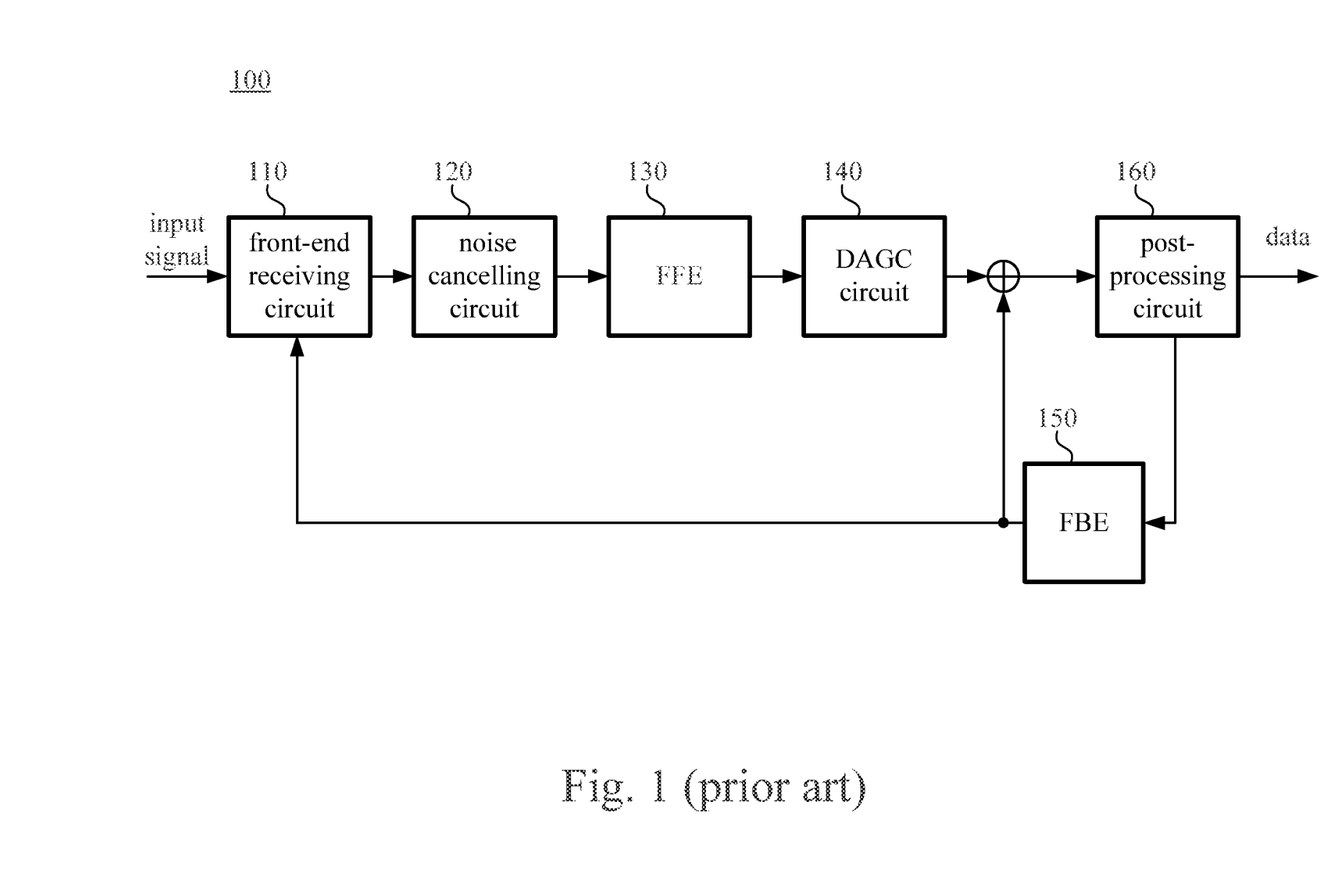
FIG. 1 illustrates a partial functional block diagram of a prior-art receiving device used in network systems.

FIG. 1 shows a partial functional block diagram of a prior-art receiving device used in network systems. The receiving device 100 includes a front-end receiving circuit 110, a noise cancelling circuit 120, a feed-forward equalizer (FFE) 130, a digital automatic gain control (DAGC) circuit 140, a feed-back equalizer (FBE) 150 and a post-processing circuit 160.

The front-end receiving circuit 110 is to receive an analog input signal from a remote end and transforms it into a digital signal. The front-end receiving circuit 110 includes an analog automatic gain control (AAGC) circuit and an analog-to-digital converter (ADC). The AAGC circuit automatically adjusts amplitudes of the input signal in order that the adjusted input signal has better amplitudes to facilitate the processing of post circuits. The ADC converts the input signal from analog domain to digital domain. In addition to the AAGC circuit and the ADC, the front-end receiving circuit 110 may include other circuits, such as a filtering circuit and a sampling/holding circuit.

The noise cancelling circuit 120 is to cancel the noises in the input signal of a channel belonging to a port. The noises are probably an echo signal of the channel, a near-end cross talk (NEXT) interference from another channel of the same port, or an alien NEXT interference from a port adjacent to the port to which the channel belongs. Echo signals occur in network applications where a channel has receiving and transmitting capabilities, such as a Multi-port Gigabit Ethernet and a Multi-port Automatic BroadR-Reach Physical Layer (BRPHY) Ethernet; NEXT interferences occur in network applications where a single port has multiple channels, such as the Multi-port Gigabit Ethernet and a Multi-port Fast Ethernet; and the alien NEXT interferences occur in network applications where multiple ports exist, such as the Multi-port Gigabit Ethernet, the Multi-port Automatic BRPHY Ethernet and the Multi-port Fast Ethernet. The noise cancelling circuit 120 includes different noise cancellers that cancel corresponding interferences. For example, an echo canceller is to cancel echo signals, a NEXT canceller is to cancel NEXT interferences, and an alien NEXT canceller is to cancel alien NEXT interferences. In general, the echo canceller, the NEXT canceller and the alien NEXT canceller have filters, and the coefficients of each filter have to be properly adjusted to achieve better noise cancelling effects.

The feed-forward equalizer (FFE) 130 is to eliminate a precursor part of the inter-symbol interferences (ISI) of the input signal while the feed-back equalizer (FBE) 150 is to eliminate a postcursor part of the ISI. For example, the feed-back equalizer (FBE) 150 may include a finite impulse response filter and an infinite impulse response filter. Likewise, the finite impulse response filter and the infinite impulse response filter have filter coefficients, which should be timely updated and trained to make the filter operate in an expected way. If, however, two or more noise cancellers or equalizers keep updating or training their individual filter coefficients by the same data code for a certain period of time, the filter coefficients of the noise canceller or the equalizers interfere with each other, which cause the filter coefficients to be not able to converge properly. This phenomenon is referred to as seed collision. Proper processes that handle seed collision are required to assure that the noise cancellers and the equalizers can work normally.

The DAGC circuit 140 is to adjust the energy of the signal in digital domain in order that the energies of the adjusted signals become uniform to facilitate the process of the post-processing circuit 160. The post-processing circuit 160 includes other circuits of the receiving device 100, such as a slicer and a decision-feedback sequence estimation (DFSE) circuit (not shown). The output of the slicer is transmitted to the feed-back equalizer (FBE) 150 and the DFSE circuit generates data carried by the input signal.

The AAGC circuit and the digital automatic gain control circuit can be implemented by programmable gain amplifiers (PGA). In general, the setting parameters of the PGAs do not change after an initialization process. Unfortunately, a dramatic change in the ambient temperature of the receiving device 100, such as in a car environment, causes big changes in the insertion loss, which forces the setting parameters of the PGAs to be adjusted correspondingly to avoid clipping of the ADC. However, when the setting parameters of the PGAs change, filter coefficients of the noise canceller or the equalizer must be adjusted accordingly. The adjusting process may probably conflict the seed collision handling processes, causing failure in timely updating the filter coefficients; therefore the receiving device 100 cannot operate effectively or accurately.

SUMMARY

In consideration of the imperfections of the prior art, an object of the present invention is to provide a signal receiving device for Ethernet and the associated control method thereof, so as to make an improvement to the prior art.

The present invention discloses a signal receiving device installed at a target channel of a target port for receiving an input signal. The signal receiving device includes a gain control circuit for adjusting the input signal according to a setting parameter; an alien NEXT canceller for cancelling an alien NEXT interference from a port adjacent to the target port; a noise canceller using a first filter to cancel a noise interference of the target channel, a first filter coefficient of the first filter being updated according to the setting parameter; a decision feedback equalizer (DFE) using a second filter to cancel an inter-symbol interference of the input signal, the second filter having a second filter coefficient; and a control circuit, coupled to the gain control circuit, the alien NEXT canceller, the noise canceller and the DFE, for temporarily stopping the gain control circuit from updating the setting parameter prior to a seed collision and temporarily stopping one of the noise canceller and the DFE from updating the first filter coefficient or the second filter coefficient during the seed collision.

The present invention also discloses a control method of a signal receiving device. The signal receiving device includes a gain control circuit, an alien NEXT canceller, a noise canceller and a DFE. The gain control circuit adjusts an input signal of the signal receiving device according to a setting parameter. The alien NEXT canceller cancels an alien NEXT interference. The noise canceller uses a first filter to cancel a noise interference and a first filter coefficient of the first filter is updated according to the setting parameter. The DFE uses a second filter to cancel an inter-symbol interference of the input signal, and the second filter having a second filter coefficient. The method includes steps of: temporarily stopping the gain control circuit from updating the setting parameter prior to a seed collision; and temporarily stopping one of the noise canceller and the DFE from updating the first filter coefficient or the second filter coefficient during the seed collision.

The Ethernet signal receiving device of the present invention and its associated control method detect the time when seed collision occurs, and temporarily stop the PGA from updating its setting parameters before seed collision occurs in order that when the echo canceller, the NEXT canceller or the decision feedback equalizer (DFE) is required to update its filter coefficients before seed collision occurs, there is always enough time to complete the update. The device and the method of the present invention further permits the PGA to adjust its setting parameters during seed collision to avoid errors in the signal receiving device. Moreover, as the PGA is permitted to adjust its setting parameters during seed collision, the alien NEXT canceller is timely turned off or on to avoid errors in the echo canceller, the NEXT canceller or the DFE.

These and other objectives of the present invention will no doubt become obvious to those of ordinary skill in the art after reading the following detailed description of the embodiments that are illustrated in the various figures and drawings.

DETAILED DESCRIPTION OF THE EMBODIMENTS

The following description is written by referring to terms of this technology field. If any term is defined in the specification, such term should be explained accordingly. Besides, the connection between objects or events in the following embodiments can be direct or indirect provided that these embodiments are still applicable under such connection. Said "indirect" means that an intermediate object or a physical space exists between the objects, or an intermediate event or a time interval exists between the events. A signal receiving device for Ethernet and the associated control method thereof are disclosed, and the detail known in this field will be omitted if such detail has little to do with the features of the present invention. People of ordinary skill in the art can choose components or steps equivalent to those described in this specification to carry out the present invention, which means that the scope of this invention is not limited to the embodiments in the specification. On account of that some or all elements of said device invention could be known, the detail of such elements will be omitted provided that this omission nowhere dissatisfies the specification and enablement requirements. Moreover, said method invention can be in the form of firmware and/or software which could be carried out by the device of this invention or the equivalent thereof; hence, the following description on the method invention will focus on the processes and steps instead of the hardware without dissatisfying the specification and enablement requirements.

Figure 2:
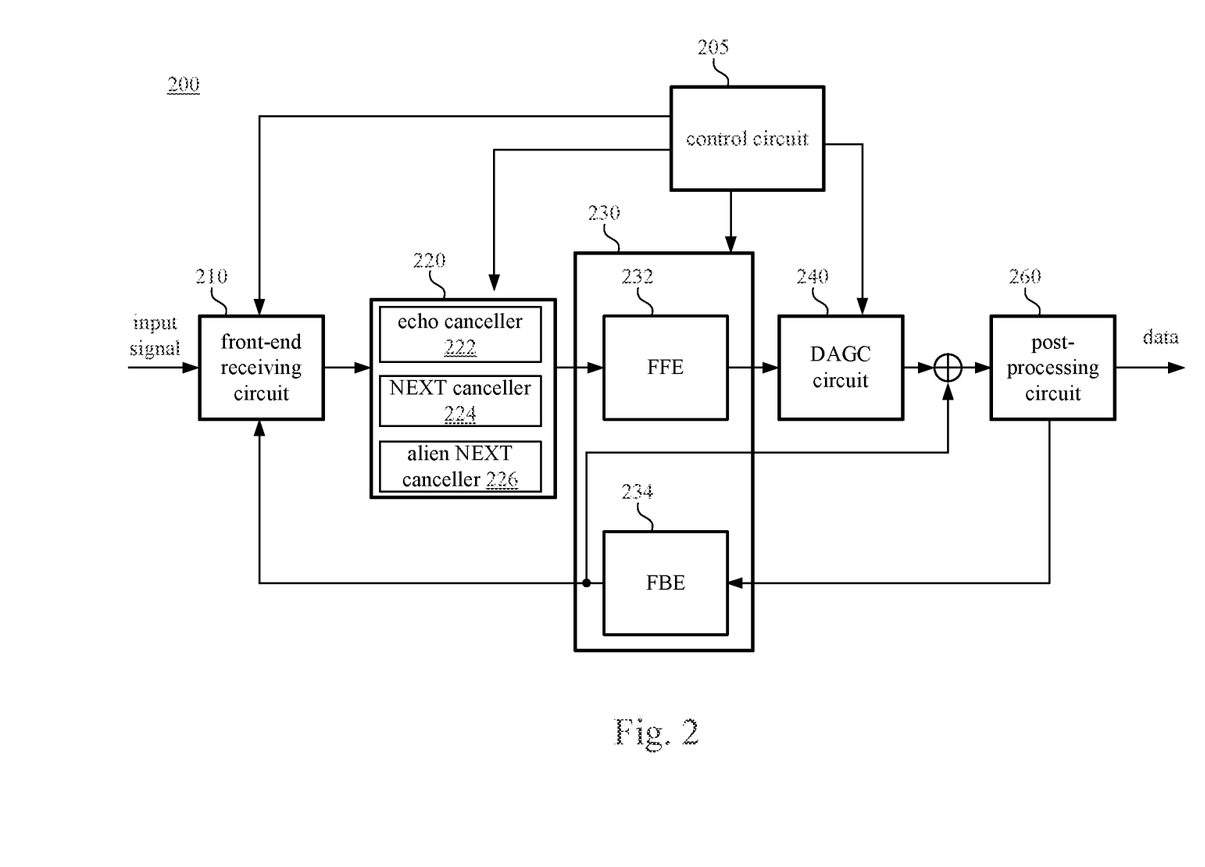
FIG. 2 illustrates a functional block diagram of a receiving device 200 according to an embodiment of the present invention.

When seed collision occurs, this invention provides corresponding handling mechanisms depending on the current network application of the receiving device. FIG. 2 illustrate a functional block diagram of a receiving device 200 according to an embodiment of the present invention. The receiving device 200 includes a control circuit 205, a front-end receiving circuit 210, a noise cancelling circuit 220, a DFE 230, a DAGC circuit 240 and a post-processing circuit 260. The front-end receiving circuit 210 includes an AAGC and an ADC. The post-processing circuit 260 includes a slicer, a DFSE circuit and other circuits of the receiving device 200. The DFE 230 includes a FFE 232 and a FBE 234. The control circuit 205 is designed to control an echo canceller 222, a near-end crosstalk (NEXT) canceller 224 and an alien NEXT canceller 226 of the noise cancelling circuit 220 to update or train their filter coefficients, and designed to control the DFE 230 to update or train its filter coefficients. Further, the control circuit 205 is able to control the way the AAGC circuit of the front-end receiving circuit 210 and the PGA of the DAGC circuit 240 adjust their individual setting parameters to improve the effectiveness and accuracy of the receiving device 200. When the receiving device 200 is used for different network applications, the noise cancelling circuit 220 includes different noise cancellers. For example, for the Multi-port Gigabit Ethernet, the noise cancelling circuit 220 includes an echo canceller 222, a NEXT canceller 224 and an alien NEXT canceller 226; for the Multi-port Automatic BRPHY Ethernet, the noise cancelling circuit 220 includes an echo canceller 222 and an alien NEXT canceller 226; and for the Multi-port Fast Ethernet, the noise cancelling circuit 220 includes a NEXT canceller 224 and an alien NEXT canceller 226. In the following, seed collision handling mechanisms of the control circuit 205 for these three network applications are introduced.

Figure 3:
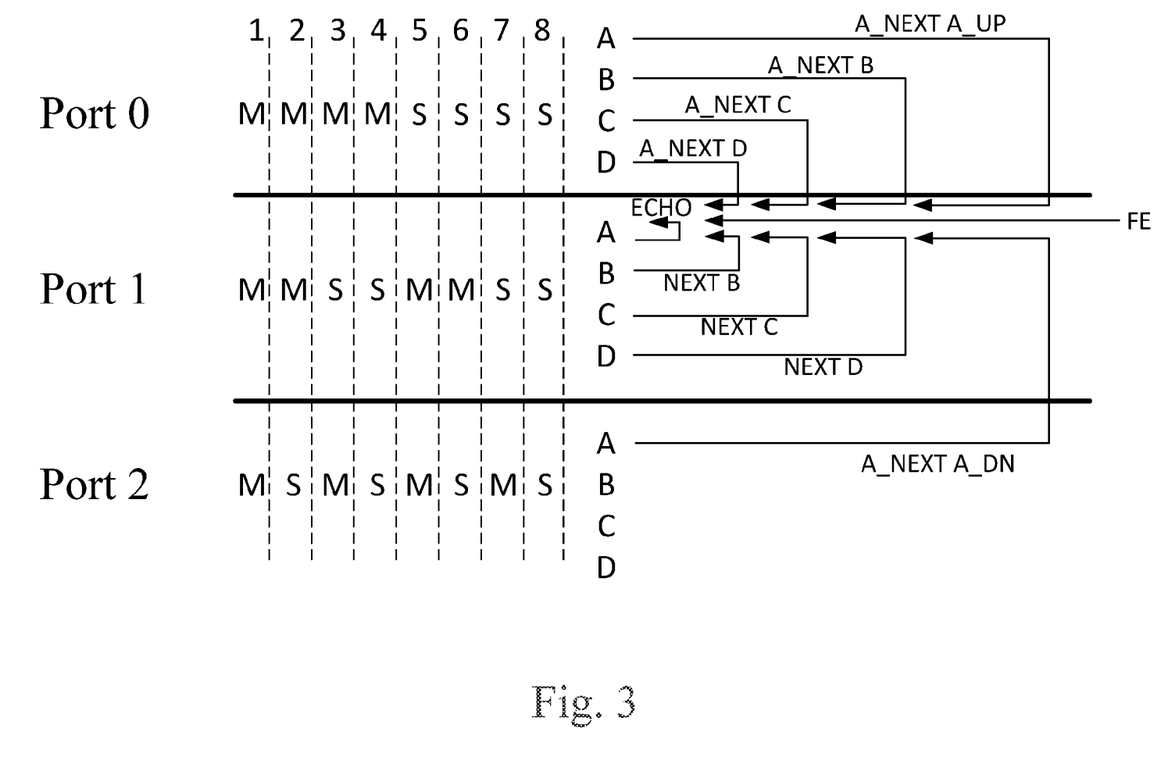
FIG. 3 illustrates interferences of a Multi-port Gigabit Ethernet.

FIG. 3 shows interferences of a Multi-port Gigabit Ethernet. As an example, 3 ports (port 0, port 1 and port 2), each having 4 channels (A, B, C and D) are shown, and each channel is able to transmit and receive signals. Each port can operate in either a master mode or a slave mode; therefore 8 combinations of operating modes for the 3 ports are shown at the left of the channel symbols. The following description uses channel A and port 1 as a reference. Channel A of port 1 receives a variety of signals. The signal FE is a signal from a remote transmitting device, which operates in a mode opposite to port 1 (e.g., if port 1 operates in the master mode, the port corresponding to the signal FE operates in the slave mode, and vice versa). The signal FE is subject to ISI during transmission. The signal ECHO is an echo interference of a signal sent by channel A itself. The signal NEXT X (X being B, C or D) is a NEXT interference from another channel of the same port as channel A (i.e., port 1 in this example). The signal A_NEXT X (X being B, C or D) is an alien NEXT interference from channels of ports adjacent to the reference port. Signals A_NEXT A_UP and A_NEXT A_DN are alien NEXT interferences from two other channels A of two other ports adjacent to the reference port. These interferences are cancelled by corresponding noise cancellers whereas the ISI of the signal FE is cancelled by the DFE 230. The handling mechanisms of the control circuit 205 is able to control a noise canceller or the DFE 230, whichever is relatively stable, to stop updating its filter coefficients as seed collision occurs in order to prevent the filter coefficients from being unable to converge; even better, in certain operating mode combinations, the control circuit 205 can avoid the possibility of seed collision between the nose cancellers and/or the DFE 230 by assigning different seeds to different ports. The handing mechanisms of the control circuit 205 corresponding to the 8 operating mode combinations are summarized in Table 1 (the operating mode representing port 0/port 1/port 2).

In the operating mode M/S/M, the control circuit 205 assigns different seeds to port 0 and port 2. In the operating modes S/M/S and S/S/S the possibility of two alien NEXT canceller 226 using the same data code to update their filter coefficients at the beginning of convergence is quite low (i.e., the possibility of seed collision is quite low) so these situations can be omitted in designing the control circuit 205 to reduce the complexity and cost of the control circuit 205.

The handing mechanisms of the 8 operating mode combinations in Table 1 are summarized below:

1. When at least 2 of the 3 ports operate in the master mode: assigning different seeds to ports operating in the master mode;
2. When the reference port operates in a different mode from its adjacent port: temporarily stopping the DFE 230 from updating its filter coefficients;

TABLE 1

| operating mode | related to signals of port 0 | related to signals of port 2 |
|---|---|---|
| M/M/M | assigning different seeds to ports 0, 1 and 2 | assigning different seeds to ports 0, 1 and 2 |
| M/M/S | assigning different seeds to ports 0 and 1 | seed collision between the alien NEXT canceller 226 and the DFE 230 → temporarily stopping the DFE 230 from updating its filter coefficients |
| M/S/M | seed collision between the alien NEXT canceller 226 and the DFE 230 → temporarily stopping the DFE 230 from updating its filter coefficients | seed collision between the alien NEXT canceller 226 and the DFE 230 → temporarily stopping the DFE 230 from updating its filter coefficients |
| M/S/S | seed collision between the alien NEXT canceller 226 and the DFE 230 → temporarily stopping the DFE 230 from updating its filter coefficients | seed collision between the alien NEXT canceller 226 and the echo canceller 222 → temporarily stopping the echo canceller 222 from updating its filter coefficients |
| S/M/M | seed collision between the alien NEXT canceller 226 and the DFE 230 → temporarily stopping the DFE 230 from updating its filter coefficients | assigning different seeds to ports 1 and 2 |
| S/M/S | seed collision between the alien NEXT canceller 226 and the DFE 230 → temporarily stopping the DFE 230 from updating its filter coefficients | seed collision between the alien NEXT canceller 226 and the DFE 230 → temporarily stopping the DFE 230 from updating its filter coefficients |
| S/S/M | 1. seed collision between the alien NEXT canceller 226 and the echo canceller 222 → temporarily stopping the echo canceller 222 from updating its filter coefficients 2. seed collision between the alien NEXT canceller 226 and the NEXT canceller 224 → temporarily stopping the NEXT canceller 224 from updating its filter coefficients | seed collision between the alien NEXT canceller 226 and the DFE 230 → temporarily stopping the DFE 230 from updating its filter coefficients |
| S/S/S | 1. seed collision between the alien NEXT canceller 226 and the echo canceller 222 → temporarily stopping the echo canceller 222 from updating its filter coefficients 2. seed collision between the alien NEXT canceller 226 and the NEXT canceller 224 → temporarily stopping the NEXT canceller 224 from updating its filter coefficients | seed collision between the alien NEXT canceller 226 and the echo canceller 222 → temporarily stopping the echo canceller 222 from updating its filter coefficients |

3. When the reference port and its adjacent port both operate in the slave mode: temporarily stopping the echo canceller 222 or the NEXT canceller 224 from updating its filter coefficients; and 4. When the two ports adjacent to the reference port both operate in the slave mode: neglecting this case since the possibility of seed collision is quite low.

In practical, an alien NEXT interference of a channel arises primarily from channels of adjacent ports that are within a range of two channels. Taking channel A of port 1 in FIG. 3 as example, the alien NEXT interference arises primarily from the signal A_NEXT D and the signal A_NEXT C, and interferences from signals A_NEXT B and A_NEXT A_UP can be ignored. As a result, types of signal interferences of the Multi-port Gigabit Ethernet can be simplified to FIG. 4, and the handling mechanisms in Table 1 can be simplified to Table 2.

TABLE 2

Figure 4:
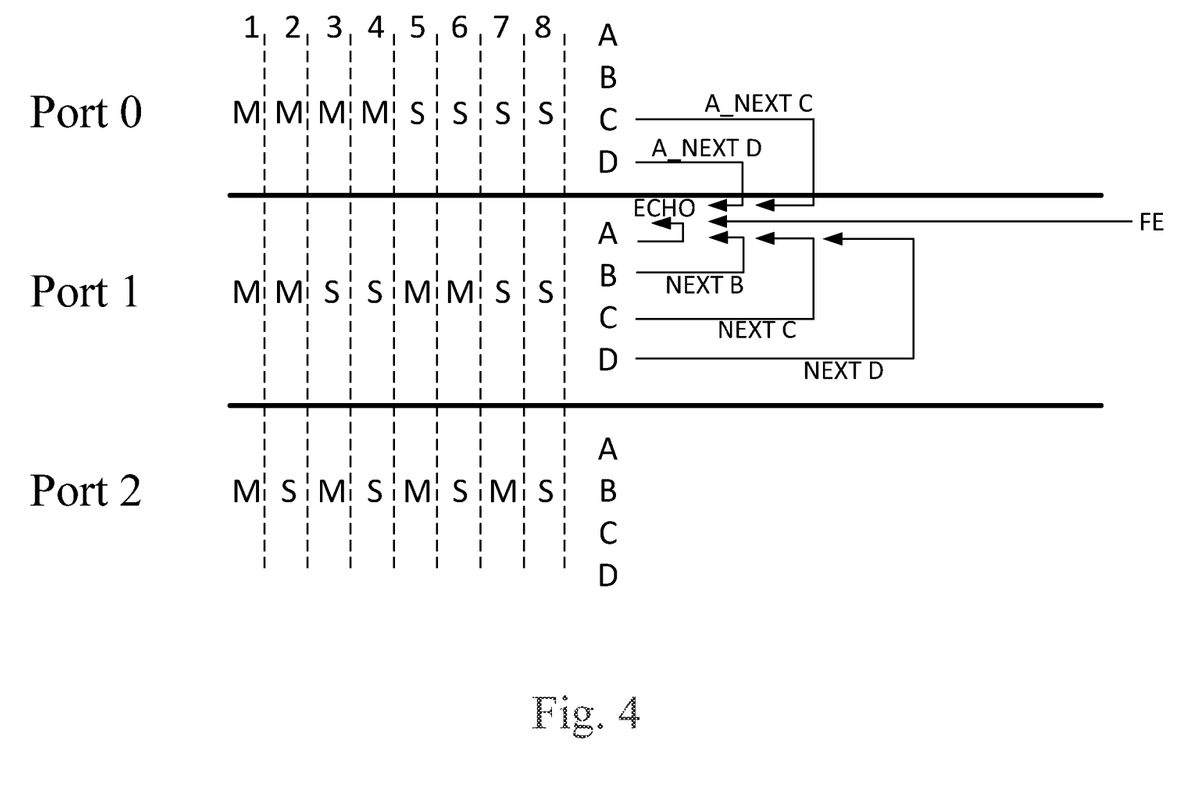
FIG. 4 illustrates simplified interferences of a Multi-port Gigabit Ethernet.

| operating mode | related to signals of port 0 | related to signals of port 2 |
|---|---|---|
| M/M/M | assigning different seeds to ports 0, 1 and 2 | assigning different seeds to ports 0, 1 and 2 |
| M/M/S | assigning different seeds to ports 0 and 1 | — |
| M/S/M | — | — |
| M/S/S | — | — |
| S/M/M | — | assigning different seeds to ports 1 and 2 |
| S/M/S | — | — |
| S/S/M | seed collision between the alien NEXT canceller 226 and the NEXT canceller 224 → temporarily stopping the NEXT canceller 224 from updating its filter coefficients | |
| S/S/S | seed collision between the alien NEXT canceller 226 and the NEXT canceller 224 → temporarily stopping the NEXT canceller 224 from updating its filter coefficients | |

The handing mechanisms of the 8 operating mode combinations in Table 2 are summarized below:

1. When at least 2 of the 3 ports operate in the master mode: assigning different seeds to ports operating in the master mode; and 2. When the reference port and its adjacent port both operate in the slave mode: temporarily stopping the NEXT canceller 224 from updating its filter coefficients.

Figure 5:
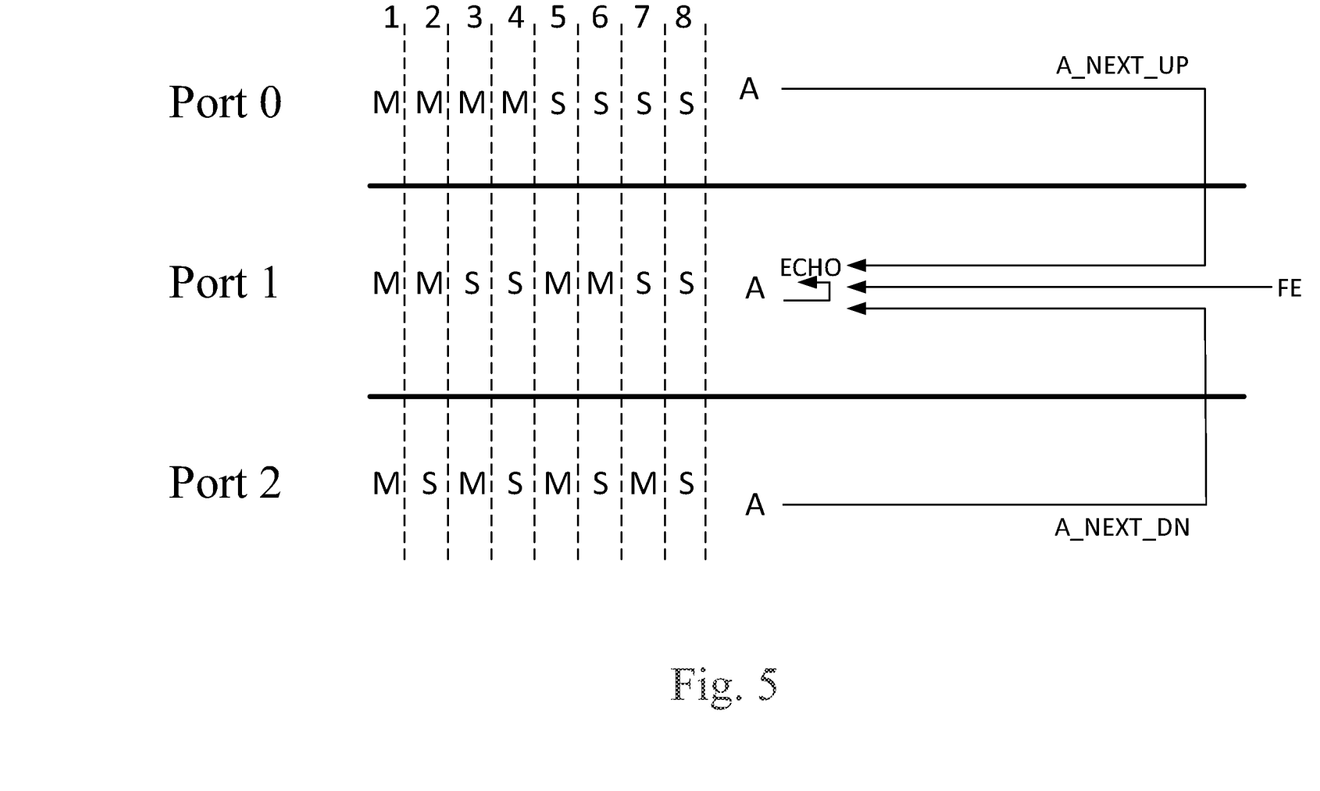
FIG. 5 illustrates interferences of a Multi-port Automatic BRPHY Ethernet.

FIG. 5 shows interferences of a Multi-port Automatic BRPHY Ethernet. Likewise, this figure shows 3 ports as an example, each having one channel capable of transmitting and receiving signals. Each port can operate in either a master mode or a slave mode; therefore 8 combinations of operating modes for the 3 ports are shown at the left of the channel symbols. The following description uses the channel of port 1 as a reference. The signal ECHO is an echo interference of a signal sent by the channel itself. The signals A_NEXT_UP and A_NEXT_DN are alien NEXT interferences from channels of ports adjacent to the reference port. The signal FE is a signal from a remote transmitting device, and is subject to ISI during transmission. The handing mechanisms of the control circuit 205 corresponding to the 8 operating mode combinations are summarized in Table 3 (the operating mode representing port 0/port 1/port 2).

TABLE 3

| operating mode | related to signals of port 0 | related to signals of port 2 |
|---|---|---|
| M/M/M | assigning different seeds to ports 0, 1 and 2 | assigning different seeds to ports 0, 1 and 2 |
| M/M/S | assigning different seeds to ports 0 and 1 | seed collision between the alien NEXT canceller 226 and the DFE 230 → temporarily stopping the DFE 230 from updating its filter coefficients |
| M/S/M | seed collision between the alien NEXT canceller 226 and the DFE 230 → temporarily stopping the DFE 230 from updating its filter coefficients | seed collision between the alien NEXT canceller 226 and the DFE 230 → temporarily stopping the DFE 230 from updating its filter coefficients |
| M/S/S | seed collision between the alien NEXT canceller 226 and the DFE 230 → temporarily stopping the DFE 230 from updating its filter coefficients | seed collision between the alien NEXT canceller 226 and the echo canceller 222 → temporarily stopping the echo canceller 222 from updating its filter coefficients |
| S/M/M | seed collision between the alien NEXT canceller 226 and the DFE 230 → temporarily stopping the DFE 230 from updating its filter coefficients | assigning different seeds to ports 1 and 2 |
| S/M/S | seed collision between the alien NEXT canceller 226 and the DFE 230 → temporarily stopping the DFE 230 from updating its filter coefficients | seed collision between the alien NEXT canceller 226 and the DFE 230 → temporarily stopping the DFE 230 from updating its filter coefficients |
| S/S/M | seed collision between the alien NEXT canceller 226 and the echo canceller 222 → temporarily stopping the echo canceller 222 from updating its filter coefficients | seed collision between the alien NEXT canceller 226 and the DFE 230 → temporarily stopping the DFE 230 from updating its filter coefficients |
| S/S/S | seed collision between the alien NEXT canceller 226 and the echo canceller 222 → temporarily stopping the echo canceller 222 from updating its filter coefficients | seed collision between the alien NEXT canceller 226 and the echo canceller 222 → temporarily stopping the echo canceller 222 from updating its filter coefficients |

Similarly, in the operating mode M/S/M, the control circuit 205 assigns different seeds to port 0 and port 2. In the operating modes S/M/S and S/S/S the possibility of two alien NEXT canceller 226 using the same data code to update their filter coefficients at the beginning of convergence is quite low (i.e., the possibility of seed collision is quite low) so these situations can be omitted in designing the control circuit 205 to reduce the complexity and cost of the control circuit 205.

The handing mechanisms of the 8 operating mode combinations in Table 3 are summarized below:

1. When at least 2 of the 3 ports operate in the master mode: assigning different seeds to ports operating in the master mode;

2. When the reference port operates in a different mode from its adjacent port: temporarily stopping the DFE 230 from updating its filter coefficients;

3. When the reference port and its adjacent port both operate in the slave mode: temporarily stopping the echo canceller 222 from updating its filter coefficients; and 4. When the two ports adjacent to the reference port both operate in the slave mode: neglecting this case since the possibility of seed collision is quite low.

Figure 6:
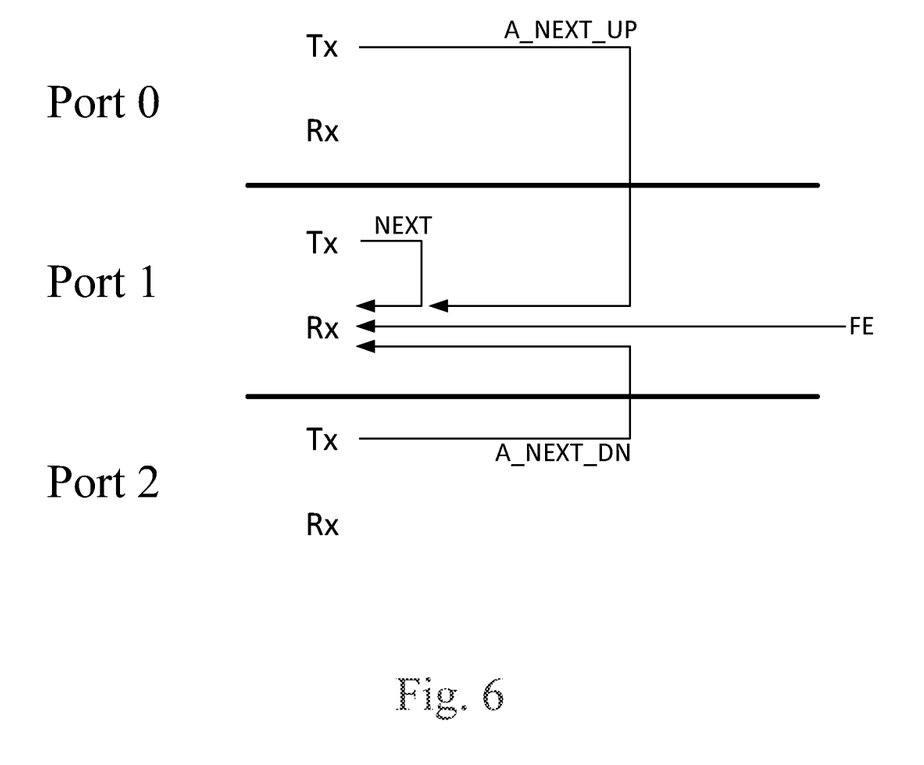
FIG. 6 illustrates interferences of a Multi-port Fast Ethernet.
Figure 7:
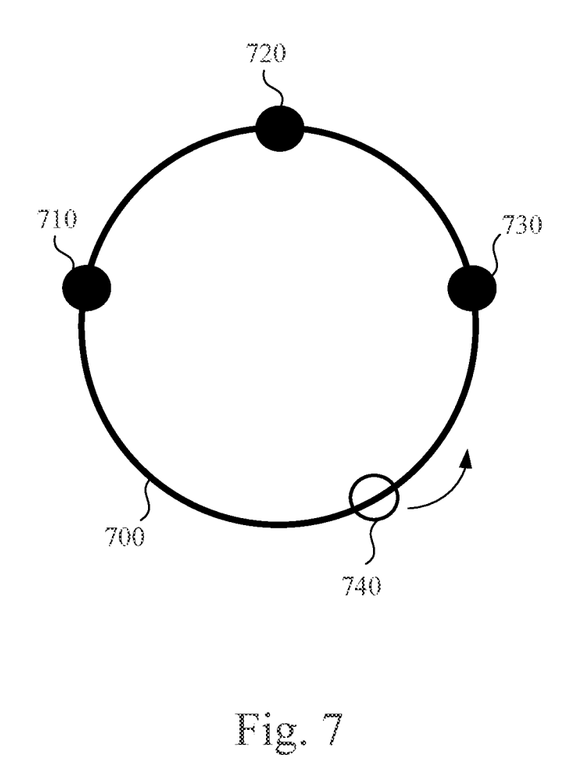
FIG. 7 illustrates a diagram of assigning different seeds to different noise cancellers.

FIG. 6 shows interferences of a Multi-port Fast Ethernet. Likewise, the figure shows 3 ports as an example, each having 2 channels for respectively transmitting (channel Tx) and receiving (channel Rx) signals. The following description uses the channel Rx of port 1 as a reference. The signal NEXT is a NEXT interference from channel Tx of the same port as channel Rx. The signals A_NEXT_UP and A_NEXT_DN are alien NEXT interferences from respective channels Tx of ports adjacent to the reference port. The signal FE is a signal from a remote transmitting device and is subject to ISI during transmission. The handing mechanisms of the control circuit 205 are: providing the same clock to the noise cancellers corresponding to the signal NEXT, the signal A_NEXT_UP and the signal A_NEXT_DN, and start points of the data codes of the noise cancellers are made different (i.e., assigning different seeds to each noise canceller); thereby seed collision is avoided from the beginning. FIG. 7 illustrates a diagram of assigning different seeds to different noise cancellers. The circle 700 represents a circular data code. The dots 710, 720 and 730 respectively represent the start points of the data codes of a NEXT canceller that cancels the signal NEXT, an alien NEXT canceller that cancels the signal A_NEXT_UP and an alien NEXT canceller that cancels the signal A_NEXT_DN. The small circle 740 represents the start point of the data code of the DFE 230. There is no seed collision among the 3 cross talk cancellers because they use the same clock source and their start points of data codes are staggered. The DFE 230, however, is not at the same speed as the 3 cross talk cancellers because the remote signal FE uses a different clock source. When seed collision is about to happen between the DFE 230 and the alien NEXT canceller that cancels the signal A_NEXT_DN (i.e., as the circle 740 approaching the dot 730), the control circuit 205 temporarily stops the DFE 230 from updating its filter coefficients; then when seed collision crisis is resolved (i.e., as the circle 740 moving away from the dot 730), the control circuit 205 controls the DFE 230 to update and train its filter coefficients again. The control circuit 205 has the same handing mechanism when seed collision is about to happen between the DFE 230 and the alien NEXT canceller that cancels the signal A_NEXT_UP or a NEXT canceller that cancels the signal NEXT.

According to the handling mechanisms above, the control circuit 205 not only controls the noise cancelling circuit 220 and the DFE 230 to update their filter coefficients, but controls the setting parameters of the PGA, which is used in an AAGC circuit and the DAGC circuit 240. When the ambient temperature of the receiving device 200 changes, the control circuit 205 first adjusts the PGA of the AAGC circuit and then controls the PGA of the DAGC circuit 240 according to an amplifying ratio of the PGA of the AAGC circuit. If the PGA of the DAGC circuit 240 is not adjusted correspondingly in response to the adjustment of the PGA of the AAGC circuit, an abrupt change in the magnification of the PGA of the AAGC will cause the output of the ADC of the front-end receiving circuit 210 to be discontinuous; therefore the magnification of the PGA of the DAGC circuit 240 must be compensated simultaneously to prevent slicer errors, which may cause errors in the received packets of the receiving device 200.

The filter coefficients of the echo canceller 222, the NEXT canceller 224 and the alien NEXT canceller 226 of the noise cancelling circuit 220 and the DFE 230 must be adjusted accordingly if the setting parameters of the PGA are adjusted. If, however, seed collision occurs at the same time, which means one of the echo canceller 222, the NEXT canceller 224, the alien NEXT canceller 226 and the DFE 230 is temporarily stopped from updating or training its filter coefficients, a conflict occurs. As a result, the handing mechanisms of the control circuit 205 must further consider this conflict situation in such a manner that when detecting that seed collision is about to occur, the control circuit 205 stops adjusting the setting parameters of the PGA to avoid this conflict. In the following description, a predetermined time before the occurrence of seed collision is defined as a seed collision interval I, and the interval during the occurrence of seed collision is defined as a seed collision interval II. Thus, when the seed collision interval I occurs, the control circuit 205 stops adjusting the setting parameters of the PGA. Because the control circuit 205 is able to know the positions of the data codes currently used by each of the echo canceller 222, the NEXT canceller 224, the alien NEXT canceller 226 and the DFE 230, seed collision interval I can be predicted by detecting whether current positions of data codes of these unit are approaching one another based on the operating clock of each unit. The echo canceller 222, the NEXT canceller 224 and the DFE 230 must adjust their filter coefficients accordingly when the setting parameters of the gain control circuits are changed; however, on the other hand, the control circuit 205 controls the echo canceller 222, the NEXT canceller 224 and the DFE 230 to temporarily stop updating their filter coefficients when seed collision occurs. In a worst case where the setting parameters of the gain control circuits are updated right before the seed collision interval I, the echo canceller 222, the NEXT canceller 224 or the DFE 230 must complete a corresponding adjustment before the seed collision interval II (i.e., in the predetermined time). Therefore, the predetermined time must be sufficient such that the echo canceller 222, the NEXT canceller 224 or the DFE 230 is able to complete updating its filter coefficients.

In principle, when seed collision interval I occurs the control circuit 205 stops adjusting the setting parameters of a PGA until seed collision interval II ends. However, the surroundings may change so dramatically during the seed collision interval I or the seed collision interval II that errors are about to happen in the receiving device 200 if the setting parameters of the PGA are not updated timely; that is to say, there must be flexibility that the PGA is permitted to update its setting parameters at the time to avoid errors. The control circuit 205 monitors this situation and uses a timer. In the seed collision interval I or the seed collision interval II when the control circuit 205 first notices that the setting parameters of the PGA must be updated, the timer is started. The control circuit 205 checks by polling whether the seed collision interval I or the seed collision interval II is still happening and whether the setting parameters of the PGA still need to be updated. If the seed collision interval I and the seed collision interval II already finish, or the setting parameters of the PGA do not need to be updated anymore before the timed interval exceeds a predetermined value, the control circuit 205 turns off and resets the timer; if, however, the timed interval exceeds the predetermined value, the control circuit 205 must temporarily permit the PGA to update its setting parameters. The predetermined value can be flexibly adjusted according to the tolerance of the receiving device 200 for environmental changes; for example, if the receiving device 200 has little tolerance for environmental changes, the predetermined value should be designed shorter. In general, the predetermined value can be seconds to minutes.

For the Multi-port Gigabit Ethernet, the Multi-port Automatic BRPHY Ethernet and the Multi-port Fast Ethernet, when a reference port and its adjacent port both operate in the slave mode, the receiving device 200 of a channel of the reference port may encounter seed collision between the alien NEXT canceller 226 and the echo canceller 222 or the NEXT canceller 224 (seed collision can be avoided by assigning different seeds to two adjacent ports both operating in the master mode). In another situation, when a reference port and its adjacent port operate in different modes, the receiving device 200 of a channel of the reference port may encounter seed collision between the alien NEXT canceller 226 and the DFE 230. The following descriptions illustrate the handing mechanisms of the control circuit 205 regarding these two situations.

Figure 8:
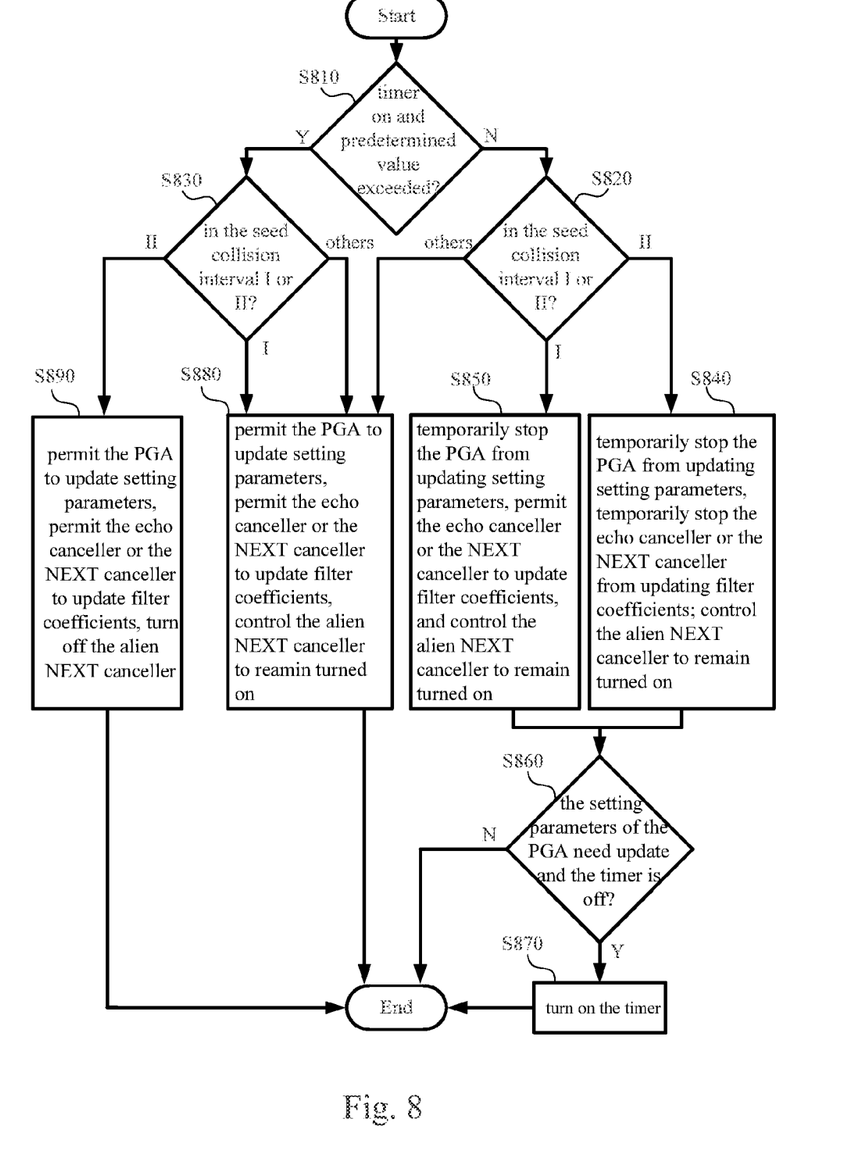
FIG. 8 illustrates a flowchart of a control method of the receiving device 200 according to an embodiment of the present invention.

FIG. 8 shows a flowchart of a control method of the receiving device 200 according to an embodiment of the present invention. This embodiment relates to a situation where the receiving device 200 encounters seed collision between the alien NEXT canceller 226 and the echo canceller 222 or the NEXT canceller 224. When the process starts, the control circuit 205 determines whether the timer is on and whether the timed interval exceeds a predetermined value (Step S810). If the timer is on and the timed interval exceeds the predetermined value, the PGA should be permitted to temporarily update its setting parameters, and the control circuit 205 operates according to whether a relationship between the data codes of the alien NEXT canceller 226 and the echo canceller 222 or the NEXT canceller 224 falls within the seed collision interval I, the seed collision interval II or neither of them (Step S830). If the timer is off or the timed interval does not exceed the predetermined value, the control circuit 205 operates according to whether a relationship between the data codes of the alien NEXT canceller 226 and the echo canceller 222 or the NEXT canceller 224 falls within the seed collision interval I, the seed collision interval II or neither of them (Step S820).

When the timer is off or the timed interval does not exceed the predetermined value, and a relative position between the data codes of the alien NEXT canceller 226 and the echo canceller 222 or the NEXT canceller 224 does not fall within the seed collision interval I and the seed collision interval II, which means no abnormal situations, the control circuit 205 operates normally; i.e., the control circuit 205 permits the PGA to update its setting parameters, controls the alien NEXT canceller 226 to remain turned on and permits the echo canceller 222 or the NEXT canceller 224 to update its filter coefficients (Step S880). When the relative position between the data codes of the alien NEXT canceller 226 and the echo canceller 222 or the NEXT canceller 224 falls within the seed collision interval I, the control circuit 205 temporarily stops the PGA from updating its setting parameters but still permits the echo canceller 222 or the NEXT canceller 224 to update its filter coefficients and controls the alien NEXT canceller 226 to remain turned on in order to continue cancelling the alien NEXT interferences (Step S850). Next, after the control circuit 205 has performed polling for one time or several times, the relative position between the data codes of the alien NEXT canceller 226 and the echo canceller 222 or the NEXT canceller 224 falls within seed collision interval II, i.e., seed collision occurs. Because the echo canceller 222 or the NEXT canceller 224 competes with the alien NEXT canceller 226 to cancel the same interference during seed collision, the echo canceller 222 or the NEXT canceller 224 must be stopped from updating its filter coefficients otherwise there will be offsets in the filter coefficients of the echo canceller 222 or the NEXT canceller 224. Further, controlling the echo canceller 222 or the NEXT canceller 224 to temporarily stop from updating its filter coefficients must be carried out after controlling the PGA to temporarily stop updating its setting parameters because the filter coefficients of the echo canceller 222 and the NEXT canceller 224 must be updated accordingly in response to the update of the setting parameters of the PGA in order that errors will not occur. In other words, when the echo canceller 222 or the NEXT canceller 224 is temporarily stopped from updating its filter coefficients, the setting parameters of the PGA must not be updated. As a result, in the step S840, the control circuit 205 not only continues stopping the PGA from updating its setting parameters, but also stops the echo canceller 222 or the NEXT canceller 224 from updating its filter coefficients; further, the alien NEXT canceller 226 is remained on.

When a relative position between the data codes of the alien NEXT canceller 226 and the echo canceller 222 or the NEXT canceller 224 falls within the seed collision interval I or the seed collision interval II, the control circuit 205 further determines whether the setting parameters of the PGA need to be updated at the time or not and whether the timer is off or not (Step S860). If the setting parameters of the PGA need to be updated and the timer is off, the control circuit 205 turn on the timer (Step S870); if the setting parameters of the PGA do not need to be updated or need to be updated but the timer is on, the control circuit 205 finishes this polling. When next polling starts, the process starts again from the Step S810.

If during a certain polling the timer is on and the timed interval exceeds the predetermined value (Step S810), the control circuit 205 determines whether a relative position between the data codes of the alien NEXT canceller 226 and the echo canceller 222 or the NEXT canceller 224 falls within the seed collision interval I or the seed collision interval II (Step S830). Since the timed interval has already exceeded the predetermined value, serious errors may probably occur due to a link down between the receiving device 200 and a remote transmitting end if the PGA is not permitted to update its setting parameters timely. So after the step S830, the control circuit 205 permits the PGA to update its setting parameters no matter whether the seed collision interval I or the seed collision interval II the control circuit 205 determines the relative position between the data codes of the alien NEXT canceller 226 and the echo canceller 222 or the NEXT canceller 224 falls within. As mentioned above, when the PGA updates its setting parameters, the echo canceller 222 or the NEXT canceller 224 must update its filter coefficients accordingly. In seed collision interval II, however, the control circuit 205 must not only permit the PGA to update its setting parameters and permits the echo canceller 222 or the NEXT canceller 224 to update its filter coefficients, but turn off the alien NEXT canceller 226 (Step S890). The alien NEXT canceller 226 is turned off because seed collision is currently happening between the alien NEXT canceller 226 and the echo canceller 222 or the NEXT canceller 224 and if the alien NEXT canceller 226 is not turned off, the filter coefficients of the alien NEXT canceller 226 and the echo canceller 222 or the NEXT canceller 224 can not converge. It should be noted that when the alien NEXT canceller 226 is turned off, it is temporarily stopped from cancelling the alien NEXT interferences but still updates its filter coefficients. It is because that the alien NEXT interferences are varying noises, and if the alien NEXT canceller 226 is stopped from updating its filter coefficients, it is unable to know the latest status of the noise, which may cause more errors.

In the step S830, if the control circuit 205 determines that a relative position between the data codes of the alien NEXT canceller 226 and the echo canceller 222 or the NEXT canceller 224 does not fall within the seed collision interval II (i.e., falls within the seed collision interval I or other intervals), the control circuit 205 not only permits the PGA to update its setting parameters, permits the echo canceller 222 or the NEXT canceller 224 to update its filter coefficients, but also controls the alien NEXT canceller 226 to remain turned on (Step S880). Because seed collision does not occur at the time, maintaining the alien NEXT canceller 226 to be on does not cause any problem. The control circuit 205 finishes this polling after the step S880 or the step S890 is done.

Figure 9:
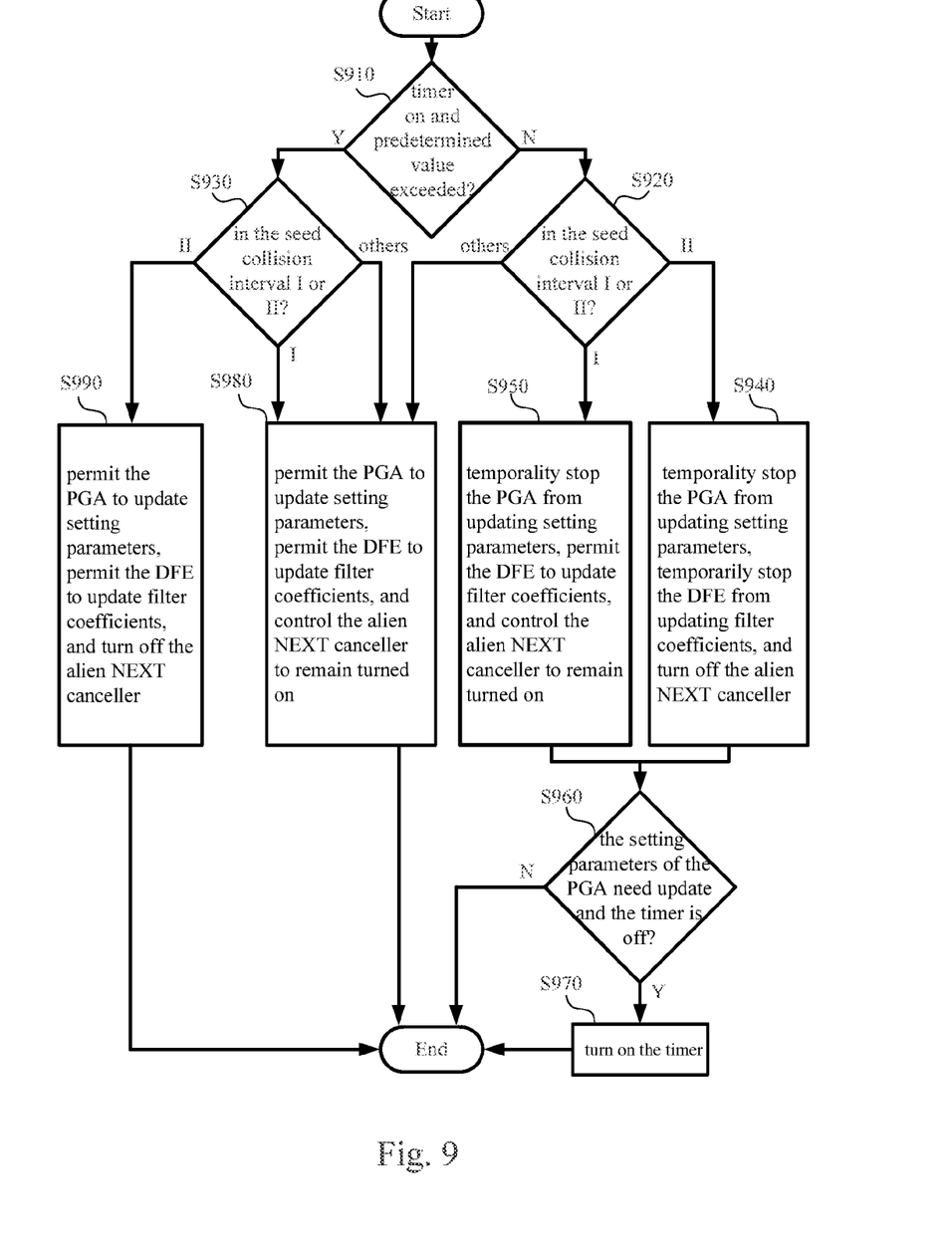
FIG. 9 illustrates a flowchart of a control method of the receiving device 200 according to another embodiment of the present invention.

FIG. 9 shows a flowchart of a control method of the receiving device 200 according to another embodiment of the present invention. This embodiment discusses a situation where the receiving device 200 encounters seed collision between the alien NEXT canceller 226 and the DFE 230. Similar to FIG. 8, at the beginning of one polling, the control circuit 205 determines whether the timer is on and the timed interval exceeds a predetermined value (Step S910). If the step S910 is negative and in the step S920 the control circuit 205 determines that a relative position between the data codes of the alien NEXT canceller 226 and the DFE 230 does not fall within the seed collision interval I and the seed collision interval II, the control circuit 205 permits the PGA to update its setting parameters, controls the alien NEXT canceller 226 to remain turned on, and permits the DFE 230 to update its filter coefficients (Step S980); if, however, the relative position is determined to fall within the seed collision interval I, the control circuit 205 temporality stops the PGA from updating its setting parameters, controls the alien NEXT canceller 226 to remained turned on, and permits the DFE 230 to update its filter coefficients (Step S950); if the relative position is determined to fall within the seed collision interval II, the control circuit 205 temporality stops the PGA from updating its setting parameters, turns off the alien NEXT canceller 226, and temporarily stops the DFE 230 from updating its filter coefficients (Step S940). The steps S960 and S970 are performed after the steps S940 and S950 and are similar to the steps S860 and S870 so detailed descriptions are omitted for brevity.

If the step S910 is affirmative and in the step S930 the control circuit 205 determines that the relative position between the data codes of the alien NEXT canceller 226 and the DFE 230 falls within the seed collision interval II, then the control circuit 205 permits the PGA to update its setting parameters, turn off the alien NEXT canceller 226, and permits the DFE 230 to update its filter coefficients (step S990); if, however, the relative position is determined not to fall within seed collision interval II (i.e., falls within seed collision interval I or other intervals), the control circuit 205 permits the PGA to update its setting parameters, controls the alien NEXT canceller 226 to remain turned on, and permits the DFE 230 to update its filter coefficients (step S980). The control circuit 205 finishes this polling after the step S980 or the step S990 is done.

The alien NEXT canceller 226 is turned off at the step S940 because when seed collision occurs between the alien NEXT canceller 226 and the DFE 230 and the DFE 230 is temporarily stopped from updating its filter coefficients, the alien NEXT canceller 226 will help handle the ISI of the input signal, which results in changes in the filter coefficients of the alien NEXT canceller 226; afterwards, the output of the alien NEXT canceller 226 will encounter errors after seed collision is over since the filter coefficients have changed. Therefore the alien NEXT canceller 226 must be temporarily turned off. The DFE 230 is temporarily stopped from updating its filter coefficients at the step S940 because the DFE 230 treats the alien NEXT interferences as input signals and tries to cancel the ISI thereof when seed collision occurs, which causes errors in the filter coefficients of the DFE 230; as a result, the receiving device 200 will encounter errors after seed collision is over. Therefore it is needed to temporarily stop the DFE 230 from updating its filter coefficients during seed collision to prevent the DFE 230 from being influenced by the alien NEXT interferences.

Since people of ordinary skill in the art can appreciate the implementation detail and the modification thereto of the present method invention of FIG. 8 and FIG. 9 through the invention of the device invention of FIG. 2, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention. Besides, each aforementioned embodiment may include one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The aforementioned descriptions represent merely the embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal receiving device installed at a target channel of a target port for receiving an input signal, comprising:
   a gain control circuit for adjusting the amplitude of the input signal;
   an alien NEXT canceller for cancelling an alien NEXT interference from a port adjacent to the target port;
   a noise canceller using a first filter to cancel a noise interference of the target channel, wherein a first filter coefficient of the first filter is updated according to whether the amplitude of the input signal is adjusted;
   a DFE using a second filter to cancel an inter-symbol interference of the input signal, wherein the second filter has a second filter coefficient; and
   a control circuit, coupled to the gain control circuit, the alien NEXT canceller, the noise canceller and the DFE, for temporarily stopping the gain control circuit from adjusting the amplitude of the input signal upon detecting a seed collision and temporarily stopping one of the noise canceller and the DFE from updating the first filter coefficient or the second filter coefficient during the seed collision.

2. The signal receiving device of claim 1, wherein the seed collision occurs between the alien NEXT canceller and the noise canceller, and the control circuit temporarily stops the noise canceller from updating the first filter coefficient during the seed collision.

3. The signal receiving device of claim 2, wherein the noise canceller is an echo canceller and the noise interference is an echo signal of the target channel.

4. The signal receiving device of claim 2, wherein the noise canceller is a NEXT canceller, and the noise interference is a NEXT interference from another channel of the target port.

5. The signal receiving device of claim 2, wherein the control circuit further determines whether the gain control circuit keeps trying to adjust the amplitude of the input signal for a predetermined period during the seed collision, if the predetermined period is exceeded, the control circuit controls the noise canceller to resume updating the first filter coefficient, controls the gain control circuit to adjust the amplitude of the input signal, and controls the alien NEXT canceller to stop cancelling the alien NEXT interference during the seed collision.

6. The signal receiving device of claim 5, wherein the control circuit controls the noise canceller to resume updating the first filter coefficient before controlling the gain control circuit to adjust the amplitude of the input signal.

7. The signal receiving device of claim 1, wherein the seed collision occurs between the alien NEXT canceller and the DFE and the control circuit temporarily stops the DFE from updating the second filter coefficient during the seed collision.

8. The signal receiving device of claim 7, wherein the alien NEXT canceller uses a third filter to cancel the alien NEXT interference, the third filter has a third filter coefficient, and the control circuit further controls the alien NEXT canceller to stop cancelling the alien NEXT interference, but the alien NEXT canceller still updates the third filter coefficient during the seed collision.

9. The signal receiving device of claim 8, wherein after the seed collision is over, the control circuit controls the DFE to resume updating the second filter coefficient, controls the gain control circuit to adjust the amplitude of the input signal, and controls the alien NEXT canceller to cancel the alien NEXT interference.

10. The signal receiving device of claim 7, wherein the control circuit further determines whether the gain control circuit keeps trying to adjust the amplitude of the input signal for a predetermined period during the seed collision, if the predetermined period is exceeded, the control circuit controls the DFE to resume updating the second filter coefficient and controls the gain control circuit to adjust the amplitude of the input signal during the seed collision.

11. The signal receiving device of claim 1, wherein before the seed collision occurs, when the gain control circuit has been temporarily stopped from adjusting the amplitude of the input signal but kept trying to adjust the amplitude of the input signal for a predetermined period, the control circuit controls one of the noise canceller and the DFE to resume updating the first filter coefficient or the second filter coefficient, controls the gain control circuit to adjust the amplitude of the input signal, and controls the alien NEXT canceller to cancel the alien NEXT interference before the seed collision.

12. A control method of a signal receiving device, the signal receiving device comprising a gain control circuit, an alien NEXT canceller, a noise canceller and a DFE, the gain control circuit adjusting the amplitude. of an input signal of the signal receiving device, the alien NEXT canceller cancelling an alien NEXT interference, the noise canceller using a first filter to cancel a noise interference, a first filter coefficient of the first filter being updated according to whether the amplitude of the input signal is adjusted, the DFE using a second filter to cancel an inter- symbol interference of the input signal, the second filter having a second filter coefficient, the method comprising: temporarily stopping the gain control circuit from adjusting the amplitude of the input signal upon detecting a seed collision; and temporarily stopping one of the noise canceller and the DFE from updating the first filter coefficient or the second filter coefficient during the seed collision.

13. The control method of claim 12, wherein the seed collision occurs between the alien NEXT canceller and the noise canceller, and the step of temporarily stopping one of the noise canceller and the DFE from updating the first filter coefficient or the second filter coefficient during the seed collision temporarily stops the noise canceller from updating the first filter coefficient.

14. The control method of claim 13, wherein the noise canceller is an echo canceller.

15. The control method of claim 13, wherein the noise canceller is a NEXT canceller.

16. The control method of claim 13 further comprising:
determining whether the gain control circuit keeps trying to adjust the amplitude of the input signal for a predetermined period during the seed collision.

17. The control method of claim 16, wherein if the predetermined period is exceeded, the method further comprises:
controlling the noise canceller to resume updating the first filter coefficient during the seed collision;
controlling the gain control circuit to adjust the amplitude of the input signal during the seed collision; and
controlling the alien NEXT canceller to stop cancelling the alien NEXT interference during the seed collision.

18. The control method of claim 17, wherein the step of controlling the noise canceller to resume updating the first filter coefficient is performed before the step of controlling the gain control circuit to adjust the amplitude of the input signal.

19. The control method of claim 12, wherein the seed collision occurs between the alien NEXT canceller and the DFE and the step of temporarily stopping one of the noise canceller and the DFE from updating the first filter coefficient or the second filter coefficient during the seed collision temporarily stops the DFE from updating the second filter coefficient.

20. The control method of claim 19, wherein the alien NEXT canceller uses a third filter to cancel the alien NEXT interference, the third filter has a third filter coefficient, and the method further comprises:
controlling the alien NEXT canceller to stop cancelling the alien NEXT interference during the seed collision; and
controlling the alien NEXT canceller to update the third filter coefficient.

21. The control method of claim 20 further comprising:
after the seed collision is over, controlling the DFE to resume updating the second filter coefficient, controlling the gain control circuit to adjust the amplitude of the input signal, and controlling the alien NEXT canceller to cancel the alien NEXT interference.

22. The control method of claim 19 further comprising:
determining whether the gain control circuit keeps trying to adjust the amplitude of the input signal for a predetermined period during the seed collision.

23. The control method of claim 22, wherein if the predetermined period is exceeded, the control method further comprises:
controlling the DFE to resume updating the second filter coefficient during the seed collision; and
controlling the gain control circuit to adjust the amplitude of the input signal during the seed collision.

24. The control method of claim 12, before seed collision occurs, when the gain control circuit has been temporarily stopped from adjusting the amplitude of the input signal but kept trying to adjust the amplitude of the input signal for a predetermined period, the control method further comprises:
controlling one of the noise canceller and the DFE to resume updating the first filter coefficient or the second filter coefficient, controlling the gain control circuit to adjust the amplitude of the input signal, and controlling the alien NEXT canceller to cancel the alien NEXT interference before the seed collision.

* * * * *